CARRYING HANDLE ACTUATED RECORDER

Filed Nov. 18, 1960 2 Sheets-Sheet 1

INVENTOR.
JOSEPH M. SEGEL
BY
Sidney W. Frick
ATTORNEY

CARRYING HANDLE ACTUATED RECORDER

Filed Nov. 18, 1960

INVENTOR.
JOSEPH M. SEGEL

BY Sidney W. Frick

ATTORNEY

United States Patent Office 3,104,289

Patented Sept. 17, 1963

3,104,289

CARRYING HANDLE ACTUATED RECORDER

Joseph M. Segel, Philadelphia, Pa., assignor, by mesne assignments, to The Jordan-Edwards Company, Inc., Upper Darby, Pa., a corporation of Pennsylvania Filed Nov. 18, 1960, Ser. No. 70,306
3 Claims. (Cl. 179—100.1)

This invention relates to sound recorders and reproducers and carrying cases therefor. More specifically the invention contemplates the combination of a miniature portable magnetic tape recorder with a conventional dispatch or attaché case or other suitable business paper carrying case without modification of the external normal appearance of the case and in such manner that the recorder is completely concealed within the case yet can be actuated and utilized without opening the case and without apparent manipulation of the case.

The principal objective of the invention is the adaptation of a typical business or traveling case for the unobtrusive concealment therein of sound recording equipment and the making of secret recordings, and thus the provision of a device useful in law enforcement work, in general investigative work, etc. The invention has the further advantage of providing an arrangement whereby the case can be opened for withdrawal of business papers or other materials still without revealing the presence of the recording equipment. Still further advantages of the invention are its adaptability to normal non-secret sound recording and reproduction usage and accompanying provision of compact carrying means including ample space for auxiliary equipment and supplies, business materials, etc.

The invention together with the foregoing objectives and advantages, as well as further objectives and advantages, will be readily understood from a consideration of the following detailed description thereof, the appended claims, and the accompanying drawings, in which:

Figures 2, 5:
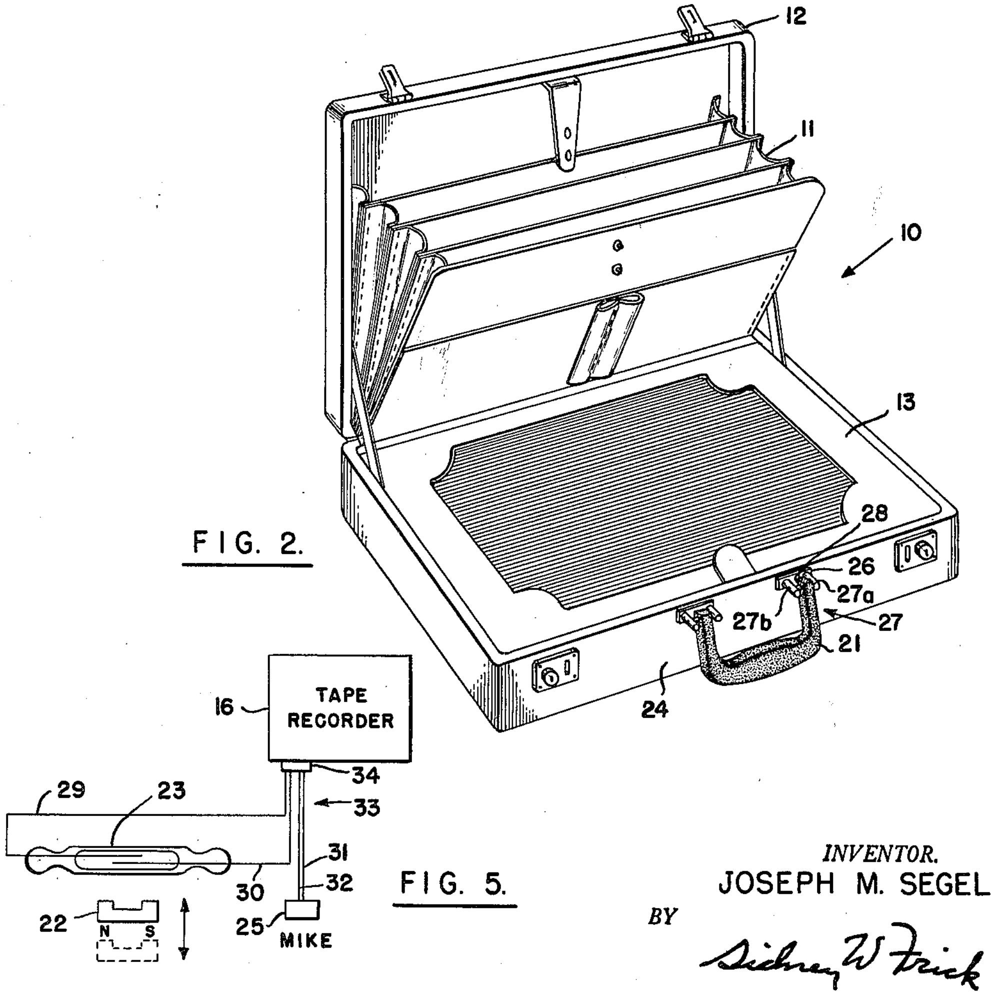
FIGURE 2 is a perspective view of the case of FIGURE 1, opened to show business paper compartments and writing platform.
FIGURE 5 is a schematic diagram showing connections between recorder, microphone and magnetic switch.
Figures 3, 4:
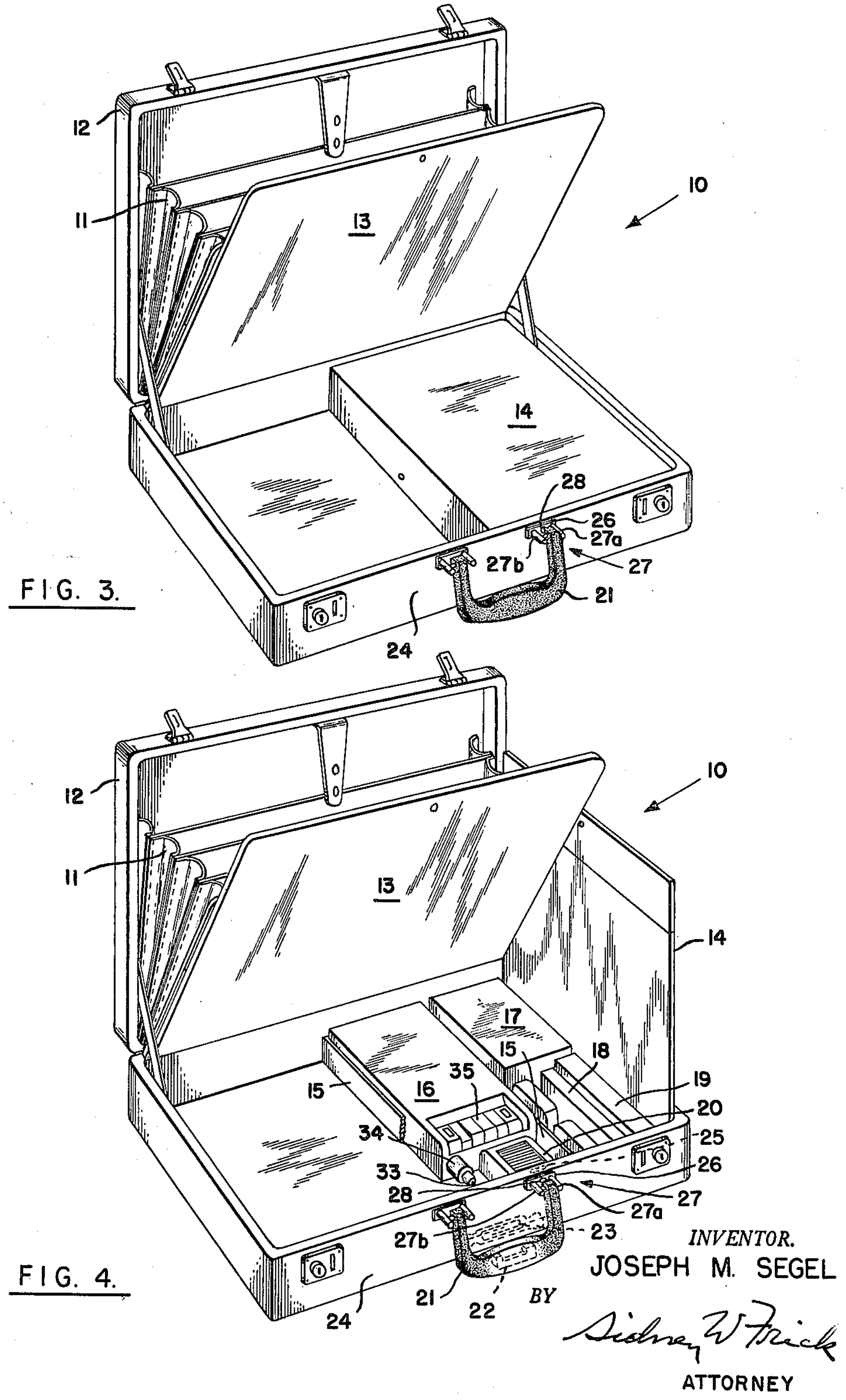
FIGURE 3 is a perspective view of the case of FIGURE 1, in which the writing platform is raised to show the sound recorder compartment cover in closed position.
FIGURE 4 is a perspective view of the case of FIGURE 1, in which the cover of the sound recorder compartment is raised to show positioning of the recorder and other equipment therein, and also showing magnetic switch components and microphone in the handle and wall of the case.

In the illustrated embodiment of the invention, a conventional attaché case 10 is modified to provide, in addition to a divided expandable business paper compartment 11 affixed to the inside of the case top 12 and a writing platform 13 which may be left in the closed position shown in FIGURE 2 or raised as shown in FIGURE 3, a recorder compartment cover 14 which may be left in the closed position shown in FIGURE 3 or raised as shown in FIGURE 4 and a recorder compartment thereunder suitably divided by baffles 15 to provide separate secure subcompartments in which are installed a miniature portable tape recorder 16, an extra tape cartridge 17 for recorder 16, a miniature camera 18, flashbulbs 19, an auxiliary microphone 20 for non-secret recorder use, and other desired accessories. It is evident of course that a wire or other type recorder could be readily substituted for tape recorder 16, with extra recording cartridge of corresponding type replacing tape cartridge 17.

The case 10 is further modified to enclose within handle 21 and without change in its external appearance or dimensions a permanent magnet 22. A hermetically sealed magnetic reed switch 23 is similarly enclosed in the case wall 24 so as to be in close actuating proximity with (i.e. within "pull-in" range of) the case handle 21 and permanent magnet 22 when the handle 21 is in the down position shown in FIGURES 1, 2, 3, and 4, and such that swinging of the handle 21 away from the down position will result in the movement of magnet 22 outside of the effective (i.e. beyond "drop-out") distance from switch 23 within which it is operative to keep switch 23 closed. Miniature microphone 25 is also enclosed within the case wall 24, immediately adjacent to plate 26 of handle mounting post assembly 27, and small hole 28 in plate 26 between posts 27*a* and 27*b* is provided for entry of sound waves to microphone 25, being so positioned as to be substantially concealed by handle 21. Completing the circuit connecting switch, recorder and microphone, switch leads 29 and 30, and microphone leads 31 and 32 are brought to the interior of the case from wall 24 at the same point, and combined into cable 33, terminating in adapter plug 34 for simple plug-in connection to the recorder 16.

Operation of the inventive recorder and case combination becomes largely self-evident from the foregoing description. Recorder 16 is set in recording position by depressing "Record" button 35, volume control is suitably adjusted, recorder compartment cover 14 is closed followed successively by writing platform 13 and case top 12 in conventional manner. The case may then be carried normally by the handle while the recorder is inoperative. If unobstrusive operation of the recorder is desired the case may simply be placed at rest in the position shown in FIGURE 1 with the handle in down position, thus closing the magnetic switch 23 and commencing operation of the recorder 16. The case may of course be placed at rest in upright or other position with handle in any other position than the down position shown in FIGURES 1, 2, 3, and 4, and the recorder will remain inoperative. Operation may be interrupted at any time simply by moving the handle away from the operative position, picking up the case in normal manner, etc.

Figure 1:
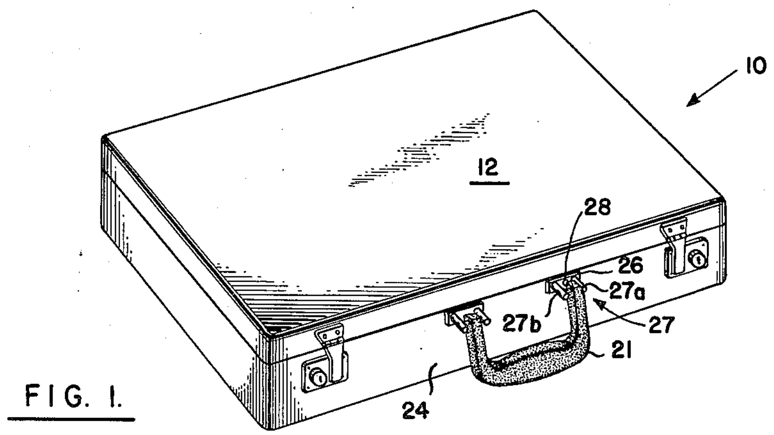
FIGURE 1 is a perspective view of an attaché case incorporating the features of the invention, in closed position.

As previously noted when the case is in operative position as in FIGURE 1 it may be opened to the position of FIGURE 2 for withdrawal or placement of business papers in compartment 11 or for use of writing platform 13 without revealing the presence of the recorder 16, and indeed the writing platform 13 could be raised to the position of FIGURE 3 without revelation of more than the closed compartment cover 14. Non-secret use of the recorder can proceed in the fully opened position of FIGURE 4. Auxiliary microphone 20 may be preferred for such use, connection being by plug-in in place of adapter plug 34.

It should be understood that the present disclosure is for the purpose of illustration only and that this invention includes all modifications and equivalents which fall within the scope of the appended claims.

I claim:

1. An attaché case having a carrying handle swingably assembled thereto, a portable sound recorder concealed within said case, a normally open magnetic reed switch so arranged as to be activated when a magnet is brought within close proximity thereto, said switch being concealed within a wall of the case adjacent to the handle, electrically conducting leads concealed within the case connecting the terminals of the switch to the recorder, and a permanent magnet concealed within the handle, the switch and the handle and magnet being so positioned relative to each other that swinging of the handle in one direction will move the magnet toward the switch and within pull-in distance thereto while swinging of the handle in the other direction will move the magnet away from the switch and beyond drop-out distance therefrom, so that when the handle is swung toward the switch position within the case wall the switch will close, thereby activating the recorder, and so that when the handle is swung away from the switch position the switch will open, thereby de-activating the recorder.

2. In combination an attaché case, a carrying handle and plate and handle mounting post assemblies swingably assembling said handle to said case, a portable sound recorder concealed within said case, a normally open magnetic reed switch so arranged as to be activated when a magnet is brought within close proximity thereto, said switch being concealed within a wall of the case adjacent to the handle, electrically conducting leads concealed within the case connecting the terminals of the switch to the recorder, and a permanent magnet concealed within the handle, the switch and the handle and magnet being so positioned relative to each other that swinging of the handle in one direction will move the magnet toward the switch and within pull-in distance thereto while swinging of the handle in the other direction will move the magnet away from the switch and beyond drop-out distance therefrom, so that when the handle is swung toward the switch position within the case wall the switch will close, thereby activating the recorder, and so that when the handle is swung away from the switch position the switch will open, thereby de-activating the recorder, a miniature microphone concealed within the case wall adjacent to a plate and handle mounting post assembly, a hole in said plate providing access of sound waves to said microphone and positioned so as to be substantially concealed by said handle, and electrically conducting leads concealed within the case connecting the terminals of the microphone to the recorder, so that when the recorder is activated it will receive from the microphone and record electrical impulses equivalent to sound waves externally impinging upon the microphone.

3. An attaché case having a divided expandable business paper compartment, a writing platform, a sound recorder compartment and a cover therefor, a portable sound recorder positioned therein, subcompartments for accessory equipment, a normally open magnetic reed switch so arranged as to be activated when a magnet is brought within close proximity thereto, said switch being enclosed within the case wall and having electrically conducting leads within the case connecting its terminals to the recorder, a swingable handle for said case and plate and handle mounting post assemblies attaching said handle to said case, a permanent magnet enclosed within said handle, the switch and the handle and magnet being so positioned relative to each other that when the handle is swung to one position the magnet is brought within pull-in range of said switch, thereby closing the switch and activating the recorder, and when the handle is swung to a different position the magnet is removed beyond drop-out distance from said switch, thereby opening the switch and de-activating the recorder, a miniature microphone enclosed within the case wall adjacent to a plate and handle mounting post assembly and having electrically conducting leads within the case connecting its terminals to the recorder, and a hole in said plate providing access of sound waves to said microphone and positioned so as to be substantially concealed by said handle, so that when the recorder is unobtrusively activated by swinging the handle it will receive from the microphone and record information impinging upon the microphone in the form of sound waves.

References Cited in the file of this patent

UNITED STATES PATENTS

| | | |
|---|---|---|
| 2,595,089 | Lifton | Apr. 29, 1952 |
| 2,640,885 | Kuhlik | June 2, 1953 |
| 2,734,123 | Gerber | Feb. 7, 1956 |
| 2,872,531 | Haynes | Feb. 3, 1959 |